(No Model.)
A. M. TERRILL.
FRUIT PICKER.
No. 598,401. Patented Feb. 1, 1898.
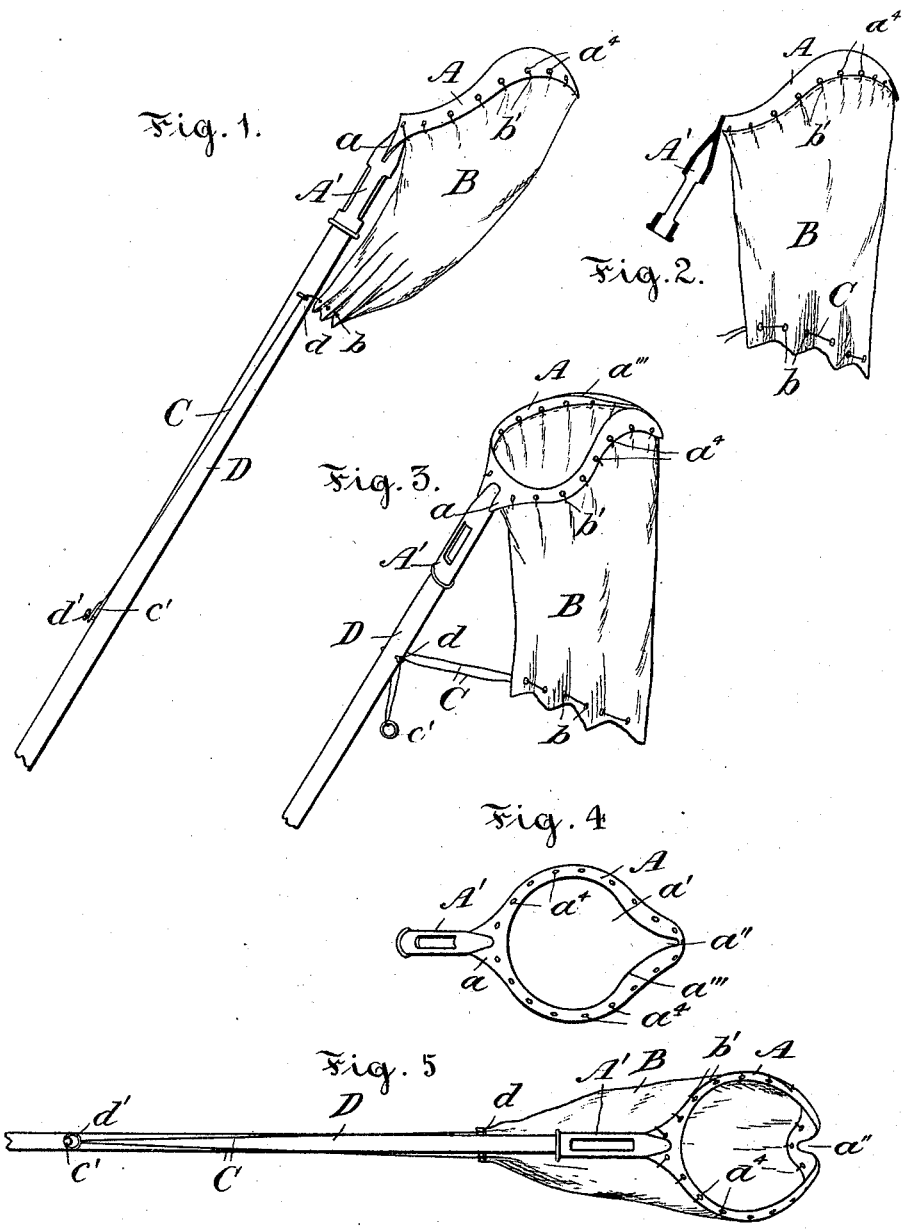
Witnesses:
Chas. V. Raley.
B. Harvey
Alfred M. Terrill
Inventor
by A. Harvey
his Attorney.

UNITED STATES PATENT OFFICE.

ALFRED M. TERRILL, OF PICTON, CANADA.

FRUIT-PICKER.

SPECIFICATION forming part of Letters Patent No. 598,401, dated February 1, 1898.

Application filed October 27, 1896. Serial No. 610,193. (No model.)

*To all whom it may concern:*

Be it known that I, ALFRED M. TERRILL, of Picton, in the county of Prince Edward, in the Province of Ontario, Dominion of Canada, have invented certain new and useful Improvements in Fruit-Pickers; and I do hereby declare that the following is a full, clear, and exact description of the same, reference being had to the accompanying drawings, forming a part hereof.

My invention, which will be hereinafter fully set forth and claimed, relates to appliances for picking apples, pears, and the like fruit from trees without allowing the fruit to drop.

The object of my invention is a fruit-picker by which fruit may be separated from the tree, gathered in a bag, and the latter emptied with facility.

Figure 1 is a side elevation of my improved fruit-picker, showing the bag closed. Fig. 2 is a longitudinal section through the center of the rim. Fig. 3 is a perspective view of the same, showing the bag open. Fig. 4 is a top view of the same, corresponding to Fig. 1, but not showing the handle; and Fig. 5 is another top view taken parallel to the handle.

A rim A, preferably of malleable cast metal, but which may be of sheet metal or other thin and light material, may be described as being the remains practically of an inverted pan or basin, approximately hemispherical in shape. It is provided with an extension $a$, which deflects somewhat from the sweep of the curve of the pan or basin, (like the peak of a jockey-cap,) so as to give the rim the proper angle on which a stem or socket $A'$ is formed, in or to which a handle D may be permanently or temporarily secured.

The rim, which is preferably light and narrow and must be stiff for holding a bag and shearing off the fruit, incloses a pear-shaped opening $a'$, approximately circular at the stem or heel end, then narrowing and terminating in a narrow elongation or slot $a''$ at the front. The circular or rear part of said opening is large enough to admit freely the largest apple or other fruit likely to be gathered and the slotted or front end narrow enough to prevent such fruit passing into or through it. To prevent injury to the fruit, the edge $a'''$ of the opening is made smooth.

The pan or basin is only so much larger than the opening required as to form a narrow rim around it and which follows the outline of said opening as nearly as may be to prevent needless weight. Said rim is provided near its outer edge with a series of perforations $a^4$. To said rim A is secured, by stitching $b'$ through the perforations $a^4$ or in some other convenient manner, as riveting and the like, the mouth of a bag B, of canvas or other pliable material. The bottom of said bag is open, but adapted to be closed by means of a cord C, passed through loops $b$, secured near the lower edge of the bag, eyelets, or the like and drawn tight against the handle D.

The handle D, of wood or any other suitable material and of any desired length, is inserted into the socket $A'$ and may be permanently or temporarily secured by a screweye or in some other suitable manner. Opposite the lower end of the bag B is secured to the handle an eye $d$, through which both ends of the cord C pass and extend down the handle any desired length, the ends being tied together or secured to a loop or ring $c'$. A button or projection $d'$ is secured to the handle D at a place corresponding to the position of the end of the cord or ring $c'$, when the cord is drawn tight and the bag closed and said ring hooked thereon. When the cord C is thus held on the button $d'$, the bottom of the bag B is kept closed and adapted to hold the gathered fruit. If it is desired to empty the bag, the ring or loop $c'$ is released from the button $d'$ and the cord C slackened, when the weight of the fruit in the bag will force the bottom of the bag open and pass through into a basket or other receptacle over which it may be held.

I claim as my invention—

1. In a fruit-picker, the combination of a stiff narrow perforated rim forming the remains of an inverted pan or basin approximately hemispherical and having a large pear-shaped opening nearly circular at the rear and terminating in an elongation or slot at the front, the outer edge following approximately the contour of said opening, an extension and socket formed at the wide or rear end of said rim, a handle secured to said socket, an open-bottomed bag having the edge of its mouth secured through the perforations of said rim, a series of eyes secured to or formed in said bag near its bottom edge, a cord passing through said eyes, an eye secured to said handle approximately opposite the bottom of said bag and a button or hook secured to said handle lower down, said cord passing through said eye and adapted to be secured to said button when drawn tight and the bottom of the bag is closed, substantially as set forth.

2. In a fruit-picker, the combination in a rim of an inverted pan or basin approximately hemispherical in shape, a pear-shaped opening in the same nearly circular at one end and large enough to admit the largest fruit to be gathered freely and gradually narrowing and terminating in a narrow elongation or slot, the outer edge of said rim following approximately the inner edge shape of the opening, an extension at the end where the opening is wide, a stem or socket formed on said extension and perforations in said rim adapting it to secure a fabric thereto, substantially as set forth.

In testimony whereof I have signed, in the presence of the undersigned witnesses, at Picton, Ontario, this 28th day of August, A. D. 1896.

ALFRED M. TERRILL.

Witnesses:
   JOHN CAVEN,
   D. L. BENGARD.